United States Patent
Kang et al.

(10) Patent No.: US 9,221,019 B2
(45) Date of Patent: *Dec. 29, 2015

(54) ORGANIC/INORGANIC HYBRID COMPOUND FOR FOULING RESISTANCE, MEMBRANE INCLUDING THE SAME FOR FOULING RESISTANCE, AND METHOD OF PREPARING MEMBRANE FOR FOULING RESISTANCE

(75) Inventors: Hyo Kang, Seoul (KR); Sung Soo Han, Hwaseong-si (KR); Jong-Chan Lee, Seoul (KR); You Hwan Son, Seoul (KR); Jung Im Han, Yongin-si (KR); Hye Young Kong, Uijeongbu-si (KR); Dong-Gyun Kim, Suwon-si (KR)

(73) Assignees: SAMSUNG ELECTRONICS CO., LTD., Gyeonggi-Do (KR); SNU R&DB FOUNDATION, Seoul (KR)

(*) Notice: Subject to any disclaimer, the term of this patent is extended or adjusted under 35 U.S.C. 154(b) by 854 days.

This patent is subject to a terminal disclaimer.

(21) Appl. No.: 13/329,756

(22) Filed: Dec. 19, 2011

(65) Prior Publication Data

US 2012/0298574 A1 Nov. 29, 2012

(30) Foreign Application Priority Data

May 27, 2011 (KR) ........................ 10-2011-0050827

(51) Int. Cl.

| B01D 71/48 | (2006.01) |
| B01D 71/70 | (2006.01) |
| B01D 65/08 | (2006.01) |
| B01D 69/12 | (2006.01) |
| C08F 290/06 | (2006.01) |
| C09D 5/16 | (2006.01) |
| B01D 61/00 | (2006.01) |
| B01D 61/02 | (2006.01) |
| B01D 61/14 | (2006.01) |

(Continued)

(52) U.S. Cl.

CPC ............ *B01D 65/08* (2013.01); *B01D 69/12* (2013.01); *B01D 71/48* (2013.01); *B01D 71/70* (2013.01); *C08F 290/062* (2013.01); *C09D 5/1662* (2013.01); *C09D 5/1668* (2013.01); *C09D 5/1675* (2013.01); *B01D 61/002* (2013.01); *B01D 61/025* (2013.01); *B01D 61/027* (2013.01); *B01D 61/145* (2013.01); *B01D 61/147* (2013.01); *B01D 2321/168* (2013.01);

(Continued)

(58) Field of Classification Search
None
See application file for complete search history.

(56) References Cited

U.S. PATENT DOCUMENTS 6,425,936 B1 * 7/2002 Sammons et al. ............ 95/45
2010/0059433 A1 3/2010 Freeman et al.

(Continued)

FOREIGN PATENT DOCUMENTS

JP 2009197070 A 9/2009
JP 2009197071 A 9/2009

(Continued)

OTHER PUBLICATIONS

Macromolecules 1999, 32, 1643-1650 "Preparation of Protein-Resistant Surfaces on Poly(vinylidene fluoride) Membranes via Surface Segregation".

(Continued)

*Primary Examiner* — Krishnan S Menon
(74) *Attorney, Agent, or Firm* — Harness, Dickey & Pierce, P.L.C.

(57) ABSTRACT

An organic/inorganic composite compound for fouling resistance may include a core and at least an arm. The core may be formed of a polyhedron of polyhedral oligomeric silsesquioxane. At least one arm may be connected to a Si atom of the polyhedral oligomeric silsesquioxane. The arm may include a vinyl-based first structural unit including at least one ethylene oxide group at the side chain, and a hydrophobic vinyl-based second structural unit.

14 Claims, 10 Drawing Sheets

(51) Int. Cl.
C08F 220/14 (2006.01)
C08F 220/28 (2006.01)

(52) U.S. Cl.
CPC ......... C08F 220/14 (2013.01); C08F 2220/286 (2013.01); C08F 2438/01 (2013.01); Y10T 428/263 (2015.01)

(56) References Cited

U.S. PATENT DOCUMENTS

2010/0093951 A1 4/2010 Oikawa et al.
2011/0120940 A1* 5/2011 Allen et al. .............. 210/500.35

FOREIGN PATENT DOCUMENTS

| KR | 20090100353 A | 9/2009 |
| KR | 20100077794 A | 7/2010 |
| WO | WO-2007120631 A1 | 10/2007 |

OTHER PUBLICATIONS

Journal of Membrane Science 345 (2009) 331-339 "Preparation of hydrophilic and fouling resistant poly(vinylidene fluoride) hollow fiber membranes".
Macromolecules 2008, 41, 4817 "Protein resistance of PEG-functionalized dendronized surfaces: Effect of PEG molecular weight and dendron generation".

* cited by examiner (a)

(b)

(a)

(b)

(c)

ORGANIC/INORGANIC HYBRID COMPOUND FOR FOULING RESISTANCE, MEMBRANE INCLUDING THE SAME FOR FOULING RESISTANCE, AND METHOD OF PREPARING MEMBRANE FOR FOULING RESISTANCE

CROSS-REFERENCE TO RELATED APPLICATION

This application claims priority under 35 U.S.C. §119 to Korean Patent Application No. 10-2011-0050827, filed in the Korean Intellectual Property Office on May 27, 2011, the entire contents of which are incorporated herein by reference.

BACKGROUND

1. Field

Example embodiments relate to an organic/inorganic composite compound for fouling resistance, a membrane including the same for fouling resistance, and a method of preparing a membrane for fouling resistance.

2. Description of the Related Art

Membrane fouling is an important problem in the membrane industry. Membrane fouling is characterized by a decrease in membrane permeation rate over time, which is generally induced by components in a feed solution passing through the membrane. The decrease may be caused by molecule adsorption in the membrane pores, pore blocking, and/or cake formation on the membrane surface. A decrease in permeation rate increases operation energy use, and to overcome this, cleaning is required. However, cleaning is only a temporary solution, and fouling typically decreases the life-span of the membrane.

As a method for reducing fouling of membranes for reverse osmotic pressure (RO), forward osmotic pressure (FO), ultra-filtration (UF), and microfiltration (MF), the impartation of a hydrophilic surface to the membrane is a solution that is capable of providing fouling resistance while increasing the life-span of the membrane.

To increase fouling resistance of a membrane by graft polymerization of a hydrophilic group on the membrane surface, various hydrophilic monomers are grafted by various synthesis membranes to restrict fouling by microorganisms such as bacteria and the like and natural organic materials such as proteins and the like. A drawback of the surface modification method is that the initiation of graft polymerization uses relatively high energy gamma radiation or plasma. This approach may increase membrane manufacture cost and may also be relatively difficult to control.

Another method for producing a fouling resistant surface is to manufacture a membrane including a microphase-separated polyacrylonitrile amphiphilic graft copolymer. Although there are drawbacks that a novel material should be developed through synthesis and a membrane manufacturing method should be established to manufacture a separation membrane, this method may minimize transformation of the membrane and provide relatively long-term stability.

Another method for producing a membrane for fouling resistance is to introduce polymeric additives having hydrophilicity during manufacture of a membrane. Since this method does not require a processing step in the manufacture of a membrane, the cost may be lower, and it may be incorporated into the existing membrane casting process with relative ease. To obtain uniform pore size, relatively homogeneous polymers should be used. However, in this system, the presence of strong chemical bonding may only occur infrequently, and thus, the hydrophilic polymeric additives may be discharged so as to deteriorate the long-term stability of the membrane.

Another method of producing a membrane for fouling resistance is to coat a hydrophilic material on the surface of a manufactured membrane. As the hydrophilic material, polydopamine, a representative material of a bio-inspired polymer, may be applied.

SUMMARY

Various embodiments relate to an organic/inorganic composite compound that has fouling resistance and that may be used in the preparation of a membrane.

Various embodiments relate to a membrane for fouling resistance to which fouling resistance is given using the organic/inorganic composite compound for fouling resistance.

Various embodiments relate to a method of manufacturing the membrane for fouling resistance to which fouling resistance is given using the organic/inorganic composite compound for fouling resistance.

According to a non-limiting embodiment, an organic/inorganic composite compound for fouling resistance may include a core formed of a polyhedron of polyhedral oligomeric silsesquioxane; and at least one arm connected to an Si atom of the polyhedral oligomeric silsesquioxane, wherein the arm includes a vinyl-based first structural unit including at least one ethylene oxide group at the side chain, and a hydrophobic vinyl-based second structural unit.

The atomic ratio of Si forming the polyhedron lattice of the polyhedral oligomeric silsesquioxane to O in the —Si—O—Si— bond may be about 1:1 to 1:3/2.

The polyhedral oligomeric silsesquioxane may be a pentahedron of the following Chemical Formula 1, a hexahedron of the following Chemical Formula 2, a heptahedron of the following Chemical Formula 3, an octahedron of the following Chemical Formula 4, an enneahedron of the following Chemical Formula 5, a decahedron of the following Chemical Formula 6, or an open polyhedron wherein O in at least one —Si—O—Si— bond is substituted by substituents and thus disconnected in the polyhedrons of the following Chemical Formulas 1 to 6.

[Chemical Formula 1]

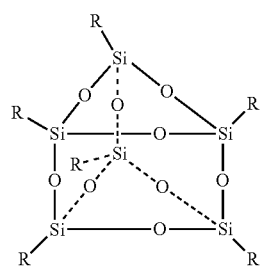

[Chemical Formula 2]

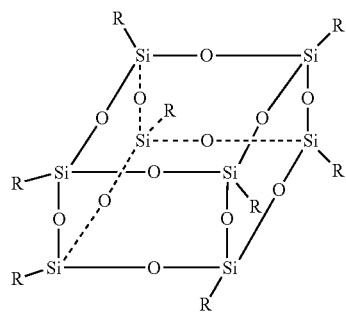

-continued

[Chemical Formula 3]

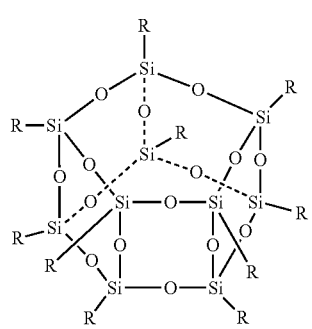

[Chemical Formula 4]

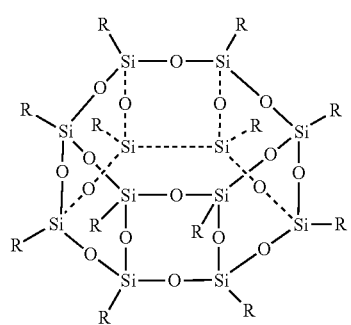

[Chemical Formula 5]

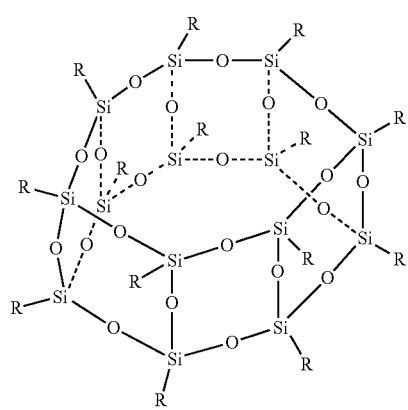

[Chemical Formula 6]

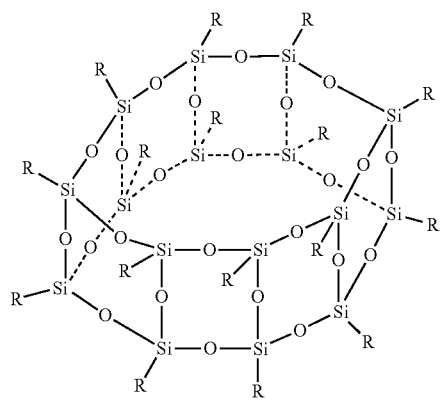

In Chemical Formulas 1 to 6, groups represented by R are the same or different, and are each independently hydrogen, a hydroxy group, a nitro group, a cyano group, an imino group (=NH or =NR$^{101}$, wherein R$^{101}$ is a C1 to C10 alkyl group), an amino group (—NH$_2$, —NH(R$^{102}$) or —N(R$^{103}$)(R$^{104}$), wherein R$^{102}$ to R$^{104}$ are each independently a C1 to C10 alkyl group), an amidino group, a hydrazine group, a hydra- zone group, a carboxyl group, a C1 to C30 alkyl group, a C1 to C30 alkylsilyl group, a C3 to C30 cycloalkyl group, a C2 to C30 heterocycloalkyl group, a C6 to C30 aryl group, a C2 to C30 heteroaryl group, a C1 to C30 alkoxy group, a C1 to C30 fluoroalkyl group, or an -L$^1$-A group (wherein L$^1$ is a linking group and A is the arm), provided that at least one group represented by R is an -L$^1$-A group.

The core of the organic/inorganic composite compound for fouling resistance may be connected by 1 to 16 arms.

The vinyl-based first structural unit including the at least one ethylene oxide group at the side chain may be represented by the following Chemical Formula 7:

[Chemical Formula 7]

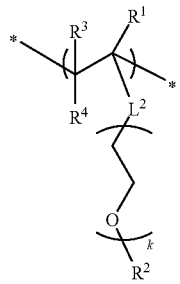

wherein, in Chemical Formula 7,

L$^2$ is a single bond, —O—, —OOC—, —COO—, —OCOO—, —NHCO—, —CONH—, —CO—, —SO$_2$—, a substituted or unsubstituted C1-C30 alkylene group, a substituted or unsubstituted C5 to C30 arylene group, a substituted or unsubstituted C3-C30 cycloalkylene group, a substituted or unsubstituted C1-C30 heterocycloalkylene group, a substituted or unsubstituted C1-C30 heteroarylene group, a substituted or unsubstituted C2-C30 alkylarylene group, a substituted or unsubstituted C2-C30 arylalkylene group, or a group where at least one group of the foregoing groups is linked together, R$^1$, R$^2$, R$^3$, and R$^4$ are each independently hydrogen, a substituted or unsubstituted C1 to C30 alkyl group, a substituted or unsubstituted C5 to C30 aryl group, a substituted or unsubstituted C3-C30 cycloalkyl group, a substituted or unsubstituted C1-C30 heterocycloalkyl group, a substituted or unsubstituted C1-C30 heteroaryl group, a substituted or unsubstituted C2-C30 alkylaryl group, or a substituted or unsubstituted C2-C30 arylalkyl group, and k is an integer ranging from 1 to 500.

The average k value of Chemical Formula 7 in one arm may be about 5 to about 100.

The hydrophobic vinyl-based second structural unit may be represented by the following Chemical Formula 9:

[Chemical Formula 9]

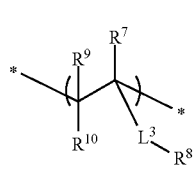

wherein, in Chemical Formula 9,

R$^7$, R$^9$, and R$^{10}$ are each independently hydrogen, a substituted or unsubstituted C1 to C30 alkyl group, a substituted or unsubstituted C5 to C30 aryl group, a substituted or unsubstituted C3-C30 cycloalkyl group, a substituted or unsubstituted C1-C30 heterocycloalkyl group, a substituted or unsubstituted C1-C30 heteroaryl group, a substituted or unsubstituted C2-C30 alkylaryl group, or a substituted or unsubstituted C2-C30 arylalkyl group, $L^3$ is a single bond, —O—, —OOC—, —COO—, —OCOO—, —NHCO—, —CONH—, —CO—, —SO$_2$—, a substituted or unsubstituted C1-C30 alkylene group, a substituted or unsubstituted C5 to C30 arylene group, a substituted or unsubstituted C3-C30 cycloalkylene group, a substituted or unsubstituted C1-C30 heterocycloalkylene group, a substituted or unsubstituted C1-C30 heteroarylene group, a substituted or unsubstituted C2-C30 alkylarylene group, a substituted or unsubstituted C2-C30 arylalkylene group, or a group where at least one group of the foregoing groups is linked together, and $R^8$ is hydrogen, a halogen, a substituted or unsubstituted C1 to C30 alkyl group, a substituted or unsubstituted C5 to C30 aryl group, a substituted or unsubstituted C3-C30 cycloalkyl group, a substituted or unsubstituted C1-C30 heterocycloalkyl group, a substituted or unsubstituted C1-C30 heteroaryl group, a substituted or unsubstituted C2-C30 alkylaryl group, a substituted or unsubstituted C2-C30 arylalkyl group, a substituted or unsubstituted C1 to C30 fluoroalkyl group, a substituted or unsubstituted silyl group, or a substituted or unsubstituted C1 to C30 fluoroalkylsilane group.

One arm may include the first structural unit and the second structural unit in a ratio of about 8 mol %:about 92 mol % to about 22 mol %:about 78 mol %.

The organic/inorganic composite compound for fouling resistance may include a linking group (e.g., $L^1$) connecting the core and the arm. $L^1$ may be a single bond, —O—, —OOC—, —COO—, —OCOO—, —NW— (W is a hydrogen atom or a C1-C10 alkyl group), —CO—, —SO$_2$—, a substituted or unsubstituted C1-C30 alkylene group, a substituted or unsubstituted C5 to C30 arylene group, a substituted or unsubstituted C3-C30 cycloalkylene group, a substituted or unsubstituted C1-C30 heterocycloalkylene group, a substituted or unsubstituted C1-C30 heteroarylene group, a substituted or unsubstituted C2-C30 alkylarylene group, a substituted or unsubstituted C2-C30 arylalkylene group, a substituted or unsubstituted silylene group, a substituted or unsubstituted C2-C30 alkenyl group, a substituted or unsubstituted C2-C30 alkynyl group, or a group where at least one group of the foregoing groups is linked together.

The organic/inorganic composite compound for fouling resistance may be water-insoluble, but may be dissolved in at least one organic solvent selected from acetone, acids, alcohols, oxygen-containing cyclic compounds, heteroatom-containing aromatic compounds, halogen compounds, aprotic polar compounds, and acetates.

According to another non-limiting embodiment, a membrane for fouling resistance may include a surface layer including the organic/inorganic composite compound for fouling resistance.

The surface layer may have a thickness of about 0.01 to about 100 um.

The membrane for fouling resistance may further include an inner layer including at least one compound selected from a polyacrylate-based compound, a polymethacrylate-based compound, a polystyrene-based compound, a polycarbonate-based compound, a polyethylene terephthalate-based compound, a polyimide-based compound, a polybenzimidazole-based compound, polybenzthiazole-based compound, a polybenzoxazole-based compound, a polyepoxy resin compound, a polyolefin-based compound, a polyphenylene vinylene compound, a polyamide-based compound, a polyacrylonitrile-based compound, a polysulfone-based compound, a cellulose-based compound, polyvinylidene fluoride (PVDF), a polytetrafluoroethylene (PTFE), and a polyvinylchloride (PVC) compound.

The membrane for fouling resistance may be a membrane for water treatment including an inner layer and a surface layer, wherein the inner layer may be formed as a microfiltration membrane, an ultrafiltration membrane, a nanofiltration membrane, a reverse osmotic membrane, or a forward osmotic membrane.

The inner layer may be a single membrane formed of a homogeneous material, or a composite membrane including a plurality of layers formed of a heterogeneous material.

According to another non-limiting embodiment, a method of manufacturing a membrane for fouling resistance may include preparing a solution including the fouling resistant organic/inorganic composite compound and a solvent, and coating the solution on the surface of a membrane requiring fouling resistance surface treatment so as to form a surface layer.

The surface layer may be formed by coating the solution on the surface of the membrane by solvent casting, spin casting, wet spinning, dry spinning, melt processing, or melt spinning.

The concentration of the solution may be about 0.1 to about 50 wt %.

DETAILED DESCRIPTION

Figure 1:
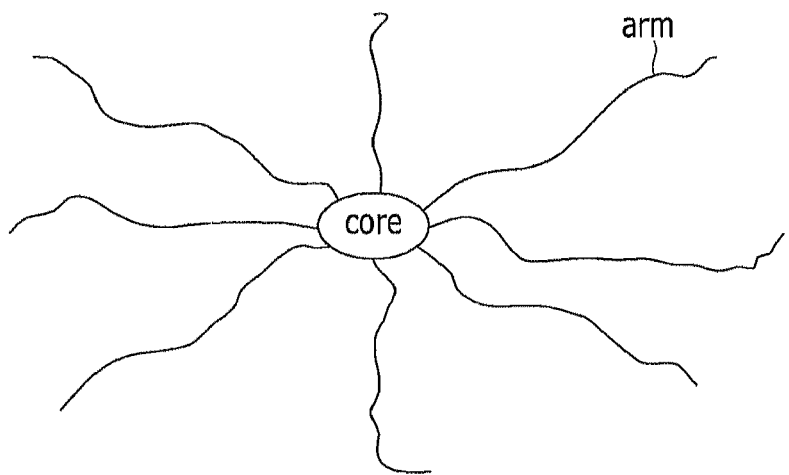
FIG. 1 is a schematic view showing the shape of an organic/inorganic composite compound for fouling resistance according to a non-limiting embodiment.
Figure 1:
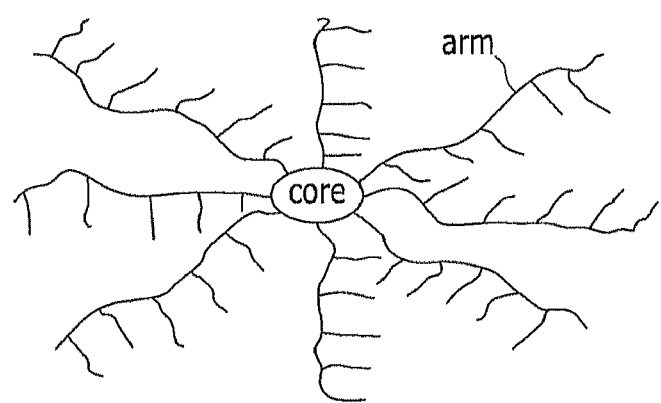

This disclosure will be described more fully hereinafter in the following detailed description, in which various non-limiting embodiments of this disclosure are described. It should be understood that this disclosure may be embodied in many different forms and is not to be construed as limited to the example embodiments set forth herein.

As used herein, when a definition is not otherwise provided, the term "substituted" may refer to one substituted with a halogen (F, Cl, Br, or I), a hydroxy group, a nitro group, a cyano group, an imino group (=NH or =NR', where R' is a C1 to C10 alkyl group), an amino group (—NH$_2$, —NH(R'''), or —N(R''')(R''''), where R'' to R'''' are each independently a C1 to C10 alkyl group), an amidino group, a hydrazine group, a hydrazone group, a carboxyl group, or a C1 to C30 alkyl group; a C1 to C30 alkylsilyl group; a C3 to C30 cycloalkyl group; a C2 to C30 heterocycloalkyl group; a C6 to C30 aryl group; a C2 to C30 heteroaryl group; a C1 to C30 alkoxy group; or a C1 to C30 fluoroalkyl group.

As used herein, when a definition is not otherwise provided, the prefix "hetero" may refer to one including 1 to 3 heteroatoms selected from N, O, S, and P, with the remaining backbone atoms in a compound or a substituent being carbons.

As used herein, when a definition is not otherwise provided, the term "combination thereof" refers to at least two substituents bound to each other by a linker, or at least two substituents condensed to each other.

As used herein, when a definition is not otherwise provided, the term "alkyl group" may refer to a "saturated alkyl group" without an alkene group or an alkyne group, or an "unsaturated alkyl group" including at least one of an alkene group and an alkyne group. The term "alkenyl group" may refer to a substituent in which at least two carbon atoms are bound in at least one carbon-carbon double bond, and the term "alkynyl group" refers to a substituent in which at least two carbon atoms are bound in at least one carbon-carbon triple bond. The alkyl group may be a branched, linear, or cyclic alkyl group.

The alkyl group may be a C1 to C20 alkyl group, and more specifically a C1 to C6 alkyl group, a C7 to C10 alkyl group, or a C11 to C20 alkyl group.

For example, a C1-C4 alkyl may have 1 to 4 carbon atoms, and may be selected from the group consisting of methyl, ethyl, propyl, iso-propyl, n-butyl, iso-butyl, sec-butyl, and t-butyl.

Examples of the alkyl group include a methyl group, an ethyl group, a propyl group, an isopropyl group, a butyl group, an isobutyl group, a t-butyl group, a pentyl group, a hexyl group, an ethenyl group, a propenyl group, a butenyl group, a cyclopropyl group, a cyclobutyl group, a cyclopentyl group, a cyclohexyl group, and the like.

The term "aromatic group" may refer to a substituent including a cyclic structure where all elements have p-orbitals which form conjugation. For example, an aryl group and/or a heteroaryl group may be utilized.

The term "aryl group" may refer to a monocyclic or fused ring-containing polycyclic (i.e., rings sharing adjacent pairs of carbon atoms) groups.

The "heteroaryl group" may refer to one including 1 to 3 heteroatoms selected from N, O, S, or P in an aryl group, with the remaining backbone atoms being carbons. When the heteroaryl group is a fused ring, each ring may include 1 to 3 heteroatoms.

The organic/inorganic composite compound for fouling resistance according to a non-limiting embodiment includes a core and at least one arm, wherein the core is formed of a polyhedron of polyhedral oligomeric silsesquioxane. The organic/inorganic composite compound for fouling resistance may include at least one arm connected to a Si atom of the polyhedral oligomeric silsesquioxane.

The number of arms of the organic/inorganic composite compound is not particularly limited but may be a quantity that correlates to the number of Si atoms included in the polyhedral oligomeric silsesquioxane. If 3 or more arms are included, the organic/inorganic composite compound may form a star shape.

The atomic ratio of Si atoms forming the polyhedron lattice of the polyhedral oligomeric silsesquioxane to O in the —Si—O—Si— bond may be about 1:1 to 1:3/2. If the atomic ratio of Si:O is 1:3/2, all of the Si atoms are connected to three adjacent Si atoms with an O atom therebetween, so as to form an —Si—O—Si— bond, thus forming a polyhedron of a closed structure.

The polyhedral oligomeric silsesquioxane may include a polyhedron of an open structure wherein a part of the —Si—O—Si— bond is disconnected, as well as a polyhedron of a closed structure having the atomic ratio of Si:O of 1:3/2. For example, the polyhedron of an open structure may be formed when O in at least one —Si—O—Si— bond of the polyhedral oligomeric silsesquioxane is substituted by substituents, thus breaking the —Si—O—Si— bond. The substituent may be as explained above without specific limitations. However, if substituents having a relatively strong hydrophobic characteristic are introduced, imparting hydrophilicity of a desired degree to the organic/inorganic composite compound for fouling resistance may be hindered. Thus, in case the organic/inorganic composite compound for fouling resistance is applied for a use requiring hydrophilicity such as a membrane for water treatment, hydrophilic substituents may be included to improve permeability performance of the membrane.

Specific examples of the polyhedral oligomeric silsesquioxane may be a pentahedron of the following Chemical Formula 1, a hexahedron of the following Chemical Formula 2, a heptahedron of the following Chemical Formula 3, an octahedron of the following Chemical Formula 4, an enneahedron of the following Chemical Formula 5, and a decahedron of the following Chemical Formula 6.

[Chemical Formula 1]

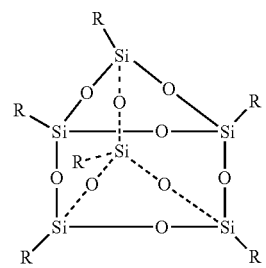

[Chemical Formula 2]

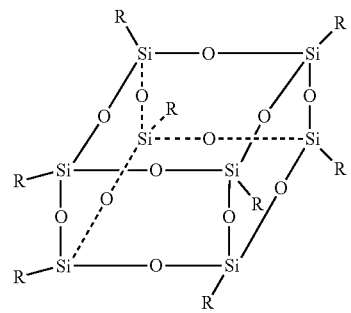

[Chemical Formula 3]

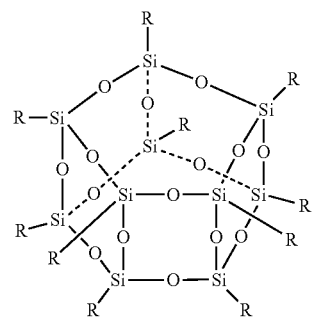

[Chemical Formula 4]

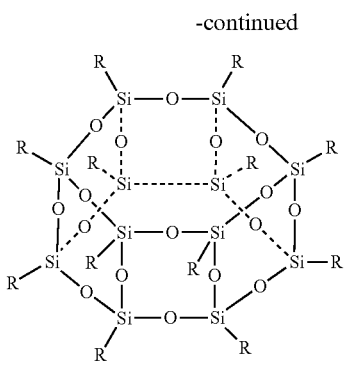

[Chemical Formula 5]

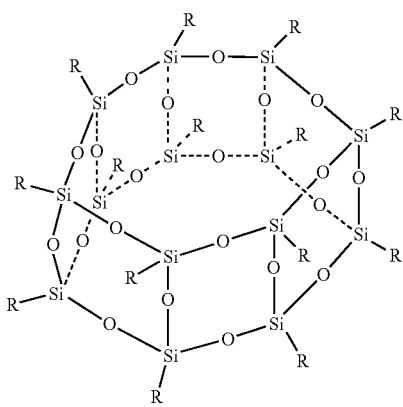

[Chemical Formula 6]

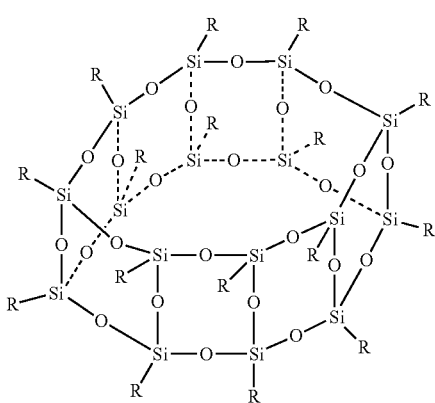

In Chemical Formulas 1 to 6, groups represented by R are the same or different, and are each independently hydrogen, a hydroxy group, a nitro group, a cyano group, an imino group (=NH or =NR$^{101}$, wherein R$^{101}$ is a C1 to C10 alkyl group), an amino group (—NH$_2$, —NH(R$^{102}$) or —N(R$^{103}$)(R$^{104}$), wherein R$^{102}$ to R$^{104}$ are each independently a C1 to C10 alkyl group), an amidino group, a hydrazine group, a hydrazone group, a carboxyl group, a C1 to C30 alkyl group, a C1 to C30 alkylsilyl group, a C3 to C30 cycloalkyl group, a C2 to C30 heterocycloalkyl group, a C6 to C30 aryl group, a C2 to C30 heteroaryl group, a C1 to C30 alkoxy group, a C1 to C30 fluoroalkyl group, or an -L-A group (wherein L is a linking group and A is the arm), provided that at least one group represented by R is an -L$^1$-A group.

In a case where the polyhedral oligomeric silsesquioxane of the above Chemical Formulas 1 to 6 has the maximum number of arms, all groups represented by R are respectively arm-connected linking groups, -L$^1$-A. For example, Chemical Formula 1 may have 6 arms, Chemical Formula 2 may have 8 arms, Chemical Formula 3 may have 10 arms, Chemical Formula 4 may have 12 arms, Chemical Formula 5 may have 14 arms, and Chemical Formula 6 may have 16 arms.

The arm connected to a Si atom of the polyhedral oligomeric silsesquioxane may include a vinyl-based first structural unit including at least one ethylene oxide group at the side chain, and a hydrophobic vinyl-based second structural unit.

The arm may be formed by copolymerization of the first structural unit and the second structural unit, in the form of a block copolymer, an alternating copolymer, a random copolymer, a graft copolymer, and the like.

The first structural unit may be represented by the following Chemical Formula 7:

[Chemical Formula 7]

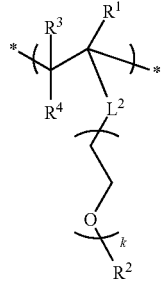

wherein, in Chemical Formula 7,

L$^2$ is a single bond, —O—, —OOC—, —COO—, —OCOO—, —NHCO—, —CONH—, —CO—, —SO$_2$—, a substituted or unsubstituted C1-C30 alkylene group, a substituted or unsubstituted C5 to C30 arylene group, a substituted or unsubstituted C3-C30 cycloalkylene group, a substituted or unsubstituted C1-C30 heterocycloalkylene group, a substituted or unsubstituted C1-C30 heteroarylene group, a substituted or unsubstituted C2-C30 alkylarylene group, a substituted or unsubstituted C2-C30 arylalkylene group, or a group where at least one group of the foregoing group is linked together, R$^1$, R$^2$, R$^3$, and R$^4$ are each independently hydrogen, a substituted or unsubstituted C1 to C30 alkyl group, a substituted or unsubstituted C5 to C30 aryl group, a substituted or unsubstituted C3-C30 cycloalkyl group, a substituted or unsubstituted C1-C30 heterocycloalkyl group, a substituted or unsubstituted C1-C30 heteroaryl group, a substituted or unsubstituted C2-C30 alkylaryl group, or a substituted or unsubstituted C2-C30 arylalkyl group, and k is an integer ranging from 1 to 500, specifically 3 to 250, and more specifically 5 to 100.

The vinyl-based first structural unit including the at least one ethylene oxide group at the side chain may be, for example, an acrylate-based structural unit as follows:

[Chemical Formula 8]

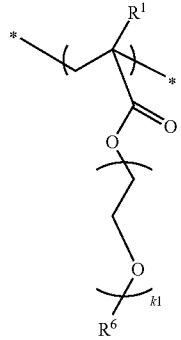

wherein, in Chemical Formula 8, $R^5$ and $R^6$ are each independently hydrogen, a substituted or unsubstituted C1 to C30 alkyl group, a substituted or unsubstituted C5 to C30 aryl group, a substituted or unsubstituted C3-C30 cycloalkyl group, a substituted or unsubstituted C1-C30 heterocycloalkyl group, a substituted or unsubstituted C1-C30 heteroaryl group, a substituted or unsubstituted C2-C30 alkylaryl group, or a substituted or unsubstituted C2-C30 arylalkyl group, and k1 is an integer ranging from 1 to 500, specifically 3 to 250, and more specifically 5 to 100.

The first structural unit may include an ethylene oxide group at the side chain, and the number of ethylene oxide groups may be increased to extend in a side chain direction of the arm, such that the organic/inorganic composite compound for fouling resistance may become a comb-shaped hydrophilic polymer. For example, even if the same amount of oxygen is included when forming a membrane, in the case of the comb-shaped polymer, the ethylene oxide group may be more exposed on the surface, and thus, oxygen content may be increased on the surface. If the oxygen content increases on the surface, the possibility of forming a hydration surface or a hydration barrier, may increase.

One arm in the organic/inorganic composite compound for fouling resistance may include a plurality of the first structural units having different k values, and one arm may have an average k value of Chemical Formula 7 of about 5 to about 100. For example, if the average k value is about 5 to about 100, the degrees of hydrophilicity and fouling resistance of the organic/inorganic composite compound for fouling resistance, and the polymerization degree of the arm, may be suitable for use in a membrane for water treatment.

The ethylene oxide group gives hydrophilicity and fouling resistance to the organic/inorganic composite compound for fouling resistance. Since the ethylene oxide group may inhibit the adsorption of, for example, a protein and the like, it has a desired anti-bio-fouling effect.

If the organic/inorganic composite compound for fouling resistance has arms connected in a star shape, the surface content of the ethylene oxide group may be further increased to further increase the fouling resistance effect. For example, the organic/inorganic composite compound for fouling resistance may have 1 to 16 arms. The organic/inorganic composite compound for fouling resistance having the above number range of the arms may properly manifest the fouling resistance effect.

The organic/inorganic composite compound for fouling resistance may be water-insoluble by including the hydrophobic vinyl-based second structural unit, and thus, it may be appropriate for use in a membrane for water treatment.

The hydrophobic vinyl-based second structural unit may be derived from, for example, an aromatic monoalkenyl monomer, an alkyl ester monomer, an unsaturated nitrile-based monomer, and the like. The vinyl-based second structural unit includes at least one hydrophobic substituent. Specifically, the hydrophobic vinyl-based second structural unit may be derived from a styrene-based, an alphaolefin-based, an acrylate-based, a methacrylate-based, an acrylonitrile-based, or an allyl-based compound, and the like, for example, styrene, p-methylstyrene, m-methylstyrene, o-methylstyrene, 2,4-dimethylstyrene, 2,5-dimethylstyrene, 3,4-dimethylstyrene, 3,5-dimethylstyrene, p-t-butylstyrene, methylmetacrylate, butylmetacrylate, methylacrylate, ethylacrylate, butylacrylate, 2-ethylhexylacrylate, decylacrylate, acrylonitrile, methacrylonitrile, ethacrylonitrile, and the like.

The hydrophobic vinyl-based second structural unit may be, for example, a vinyl-based structural unit of the following Chemical Formula 9:

[Chemical Formula 9]

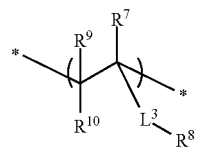

wherein, in Chemical Formula 9, $R^7$, $R^9$, and $R^{10}$ are each independently hydrogen, a substituted or unsubstituted C1 to C30 alkyl group, a substituted or unsubstituted C5 to C30 aryl group, a substituted or unsubstituted C3-C30 cycloalkyl group, a substituted or unsubstituted C1-C30 heterocycloalkyl group, a substituted or unsubstituted C1-C30 heteroaryl group, a substituted or unsubstituted C2-C30 alkylaryl group, or a substituted or unsubstituted C2-C30 arylalkyl group, $L^3$ is a single bond, —O—, —OOC—, —COO—, —OCOO—, —NHCO—, —CONH—, —CO—, —$SO_2$—, a substituted or unsubstituted C1-C30 alkylene group, a substituted or unsubstituted C5 to C30 arylene group, a substituted or unsubstituted C3-C30 cycloalkylene group, a substituted or unsubstituted C1-C30 heterocycloalkylene group, a substituted or unsubstituted C1-C30 heteroarylene group, a substituted or unsubstituted C2-C30 alkylarylene group, a substituted or unsubstituted C2-C30 arylalkylene group, or a group where at least one group of the foregoing groups is linked together, and $R^8$ is hydrogen, a halogen, a substituted or unsubstituted C1 to C30 alkyl group, a substituted or unsubstituted C5 to C30 aryl group, a substituted or unsubstituted C3-C30 cycloalkyl group, a substituted or unsubstituted C1-C30 heterocycloalkyl group, a substituted or unsubstituted C1-C30 heteroaryl group, a substituted or unsubstituted C2-C30 alkylaryl group, a substituted or unsubstituted C2-C30 arylalkyl group, a substituted or unsubstituted C1 to C30 fluoroalkyl group, a substituted or unsubstituted silyl group, or a substituted or unsubstituted C1 to C30 fluoroalkylsilane group.

Furthermore, the hydrophobic vinyl-based second structural unit may be, for example, an acrylate-based structural unit of the following Chemical Formula 10:

[Chemical Formula 10]

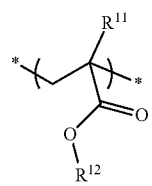

wherein, in Chemical Formula 10, $R^{11}$ is hydrogen, a substituted or unsubstituted C1 to C30 alkyl group, a substituted or unsubstituted C5 to C30 aryl group, a substituted or unsubstituted C3-C30 cycloalkyl group, a substituted or unsubstituted C1-C30 heterocycloalkyl group, a substituted or unsubstituted C1-C30 heteroaryl group, a substituted or unsubstituted C2-C30 alkylaryl group, or a substituted or unsubstituted C2-C30 arylalkyl group, and $R^{12}$ is hydrogen, a halogen, a substituted or unsubstituted C1 to C30 alkyl group, a substituted or unsubstituted C5 to C30 aryl group, a substituted or unsubstituted C3-C30 cycloalkyl group, a substituted or unsubstituted C1-C30 heterocycloalkyl group, a substituted or unsubstituted C1-C30 heteroaryl group, a substituted or unsubstituted C2-C30 alkylaryl group, a substituted or unsubstituted C2-C30 arylalkyl group, a substituted or unsubstituted C1 to C30 fluoroalkyl group, a substituted or unsubstituted silyl group, or a substituted or unsubstituted C1 to C30 fluoroalkylsilane group.

One arm of the organic/inorganic composite compound may include the first structural unit and the second structural unit in the ratio of about 8 mol %:about 92 mol % to about 22 mol %:about 78 mol %. For example, the arm may include the first structural unit in the content of about 8 mol %, 9 mol %, about 10 mol %, about 11 mol %, about 12 mol %, about 13 mol %, about 14 mol %, about 15 mol %, about 16 mol %, about 17 mol %, about 18 mol %, about 19 mol %, about 20 mol %, 21 mol %, or about 22 mol %. If the first structural unit and the second structural unit are included in the ratio of about 8 mol %:about 92 mol % to about 22 mol %:about 78 mol %, the organic/inorganic composite compound for fouling resistance may have characteristics of hydrophilicity, a water-insoluble property, fouling resistance, and the like such that it is suitable for use as a membrane for water treatment, and it may be soluble in a solvent for forming a membrane.

For example, the organic/inorganic composite compound for fouling resistance may be water-insoluble, while it may be dissolved in at least one organic solvent of acetone; acids such as acetic acid, trifluoroacetic acid (TFA), and the like; alcohols such as methanol, isopropanol, 1-methoxy-2-propanol, ethanol, terpineol, and the like; oxygen-containing cyclic compounds such as tetrahydrofuran (THF), 1,4-dioxane (THF), 1,4-dioxane, and the like; aromatic compounds including a heteroatom of N, O, or S, such as pyridine and the like; halogen compounds such as chloroform, methylene chloride, and the like; aprotic polar compounds such as dimethyl formamide (DMF), dimethyl acetamide (DMAC), dimethyl sulfoxide (DMSO), N-methyl-2-pyrrolidone (NMP), and the like; and acetates such as 2-butoxyethylacetate, 2 (2-butoxyethoxy)ethylacetate, and the like. The organic/inorganic composite compound for fouling resistance should be water-insoluble in order to be used for a membrane for water treatment, and it should be soluble in a certain organic solvent in order to manufacture a membrane. These characteristics may be provided by controlling the structure of the arms including the first structural unit and the second structural unit as explained above. For example, solubility in a certain organic solvent or water can be determined by varying the amount ratio of the first structural unit and the second structural unit in the arms.

In the organic/inorganic composite compound for fouling resistance, the core and the arms may be connected by a linking group, $L^1$. The linking group, $L^1$ may be, for example, a single bond, —O—, —OOC—, —COO—, —OCOO—, —NW— (where W is a hydrogen atom or a C1-C10 alkyl group), —CO—, —SO$_2$—, a substituted or unsubstituted C1-C30 alkylene group, a substituted or unsubstituted C5 to C30 arylene group, a substituted or unsubstituted C3-C30 cycloalkylene group, a substituted or unsubstituted C1-C30 heterocycloalkylene group, a substituted or unsubstituted C1-C30 heteroarylene group, a substituted or unsubstituted C2-C30 alkylarylene group, a substituted or unsubstituted C2-C30 arylalkylene group, a substituted or unsubstituted silylene group, a substituted or unsubstituted C2-C30 alkenyl group, a substituted or unsubstituted C2-C30 alkynyl group, or a group where at least one group of the foregoing groups is linked together.

FIG. 1 (a) is a schematic view of one example wherein the organic/inorganic composite compound for fouling resistance has a star shape, and FIG. 1 (b) is a schematic view of one example wherein the ethylene oxide groups included in the side chain of the arm are formed in a comb shape.

The organic/inorganic composite compound for fouling resistance may have a core formed of a polyhedron of polyhedral oligomeric silsesquioxane, but is not limited thereto. For example, the core may be in the form of an inorganic oxide and the arm may be connected through a linking group. The inorganic oxide may include, for example, silica, titania, alumina, zirconia, yttria, chromium oxide, zinc oxide, iron oxide, clay, zeolite, and the like, but is not limited thereto.

A membrane for fouling resistance according to a non-limiting embodiment includes a surface layer including the organic/inorganic composite compound for fouling resistance.

The membrane for fouling resistance is imparted with the fouling resistance characteristic by forming a surface layer including the organic/inorganic composite compound for fouling resistance on a membrane requiring the fouling resistance characteristic. The membrane for fouling resistance has a desired effect of preventing the formation of biofilms, and thus, it may secure fouling resistance performance, thereby extending the life-span of the membrane, decreasing the number of washings, and reducing operation energy consumption.

Figure 2:
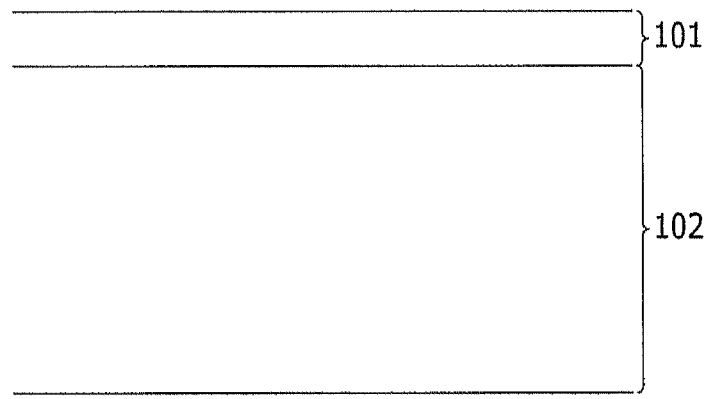
FIG. 2 is a schematic view of a membrane for fouling resistance including a surface layer and an inner layer according to a non-limiting embodiment.

The shape and the kind of the membrane are not limited and any membrane formed by a known method using a known material may be used. Such a membrane may be used as an inner layer, and a surface layer including the organic/inorganic composite compound for fouling resistance may be formed on the surface to manufacture the membrane for fouling resistance. FIG. 2 is a schematic view of a membrane for fouling resistance including a surface layer 101 and an inner layer 102.

The surface layer 101 may have a thickness of about 0.01 to about 100 um, for example, about 0.02 to about 50 um. When the surface layer 101 has a thickness of about 0.01 to about 100 um, fouling resistance may be properly manifested.

The inner layer 102 may include, for example, at least one compound selected from a polyacrylate-based compound, a polymethacrylate-based compound, a polystyrene-based compound, a polycarbonate-based compound, a polyethylene terephthalate-based compound, a polyimide-based compound, a polybenzimidazole-based compound, a polybenzthiazole-based compound, a polybenzoxazole-based compound, a polyepoxy resin compound, a polyolefin-based compound, a polyphenylene vinylene compound, a polyamide-based compound, a polyacrylonitrile-based compound, a polysulfone-based compound, a cellulose-based compound, polyvinylidene fluoride (PVDF), polytetrafluoroethylene (PTFE), and a polyvinyl chloride (PVC) compound.

The surface layer 101 may be formed by any known method, and the method is not specifically limited. For example, a process such as solvent casting, spin casting, wet spinning, dry spinning, and the like may be used, and melt processing such as injection, melt spinning, and the like may be applied. Specifically, in the case of solvent casting, a solution wherein the organic/inorganic composite compound for fouling resistance is dissolved in a solvent is prepared, which is then coated on the surface of a membrane that will become an inner layer, and dried to manufacture a membrane for fouling resistance. The concentration of the solution may be about 0.1 to about 50 wt %.

The surface layer formed by the above method may be a continuous coating layer or a discontinuous coating layer.

Specifically, the membrane for fouling resistance may be a membrane for water treatment, for example, a separation membrane for water treatment. The separation membrane for water treatment may be a microfiltration membrane, an ultrafiltration membrane, a nanofiltration membrane, a reverse osmotic membrane, or a forward osmotic membrane according to use, and it may be divided according to the size of particles to be separated. A method of manufacturing the separation membrane is not limited, and the membrane may be manufactured by known methods while controlling the pore size, the pore structure, and the like.

The membrane for fouling resistance may be a separation membrane for water treatment wherein the inner layer is a microfiltration membrane, an ultrafiltration membrane, a nanofiltration membrane, a reverse osmotic membrane, or a forward osmotic membrane. Further, for example, the inner layer may be a single membrane formed of a homogeneous material, or a composite membrane including a plurality of layers formed of a heterogeneous material.

In the case that the membrane for fouling resistance is a separation membrane for water treatment, the inner membrane may include pores, and the organic/inorganic composite compound for fouling resistance may be penetrated into the pores exposed on the surface of the inner membrane when coating a surface layer.

Additionally, in the case that the membrane for fouling resistance is a separation membrane for water treatment, it may be used for various water treatment devices, for example, a water treatment device of a reverse osmosis type, a water treatment device of a forward osmosis type, and the like, but is not limited thereto.

The water treatment device may be applied for water purification, wastewater treatment and reuse, seawater desalination, and the like.

Hereinafter, various embodiments are illustrated in more detail with reference to the following examples. However, it should be understood that the following are example embodiments and are not limiting.

EXAMPLE

Precursor Synthesis

1) Synthesis of octakis(3-hydroxypropyldimethylsiloxy) octasilsesquioxane: OHPS

About 0.5 g of octakis(hydrodimethylsiloxy)octasilsesquioxane (commercially available reagent, see the following Chemical Formula 11) is put in a 50 ml round-bottomed flask and dissolved in about 6 ml of toluene, and then about 0.34 ml of allyl alcohol is added thereto. Then, platinum(0)-1,3-divinyl-1,1,3,3-tetramethyldisiloxane (a 2 wt % Pt/xylene solution) is injected using a syringe, while agitating the reaction solution at about 25° C., under a nitrogen atmosphere. After reacting for 1 hour, toluene and unreacted allyl alcohol are removed with a rotary evaporator. The obtained material is dried in a vacuum oven at about 35° C. for an additional 12 hours to obtain about 0.748 g of brown solid OHPS (see the following Chemical Formula 12).

[Chemical Formula 11]

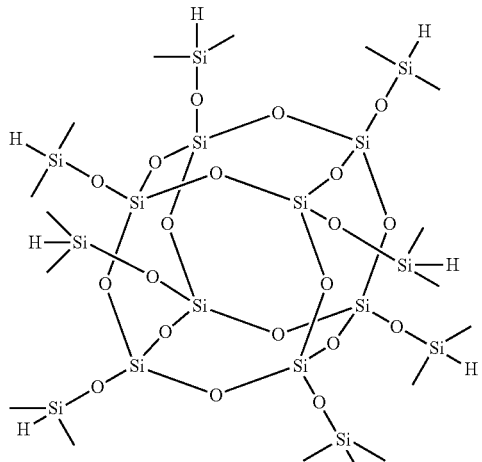

[Chemical Formula 12]

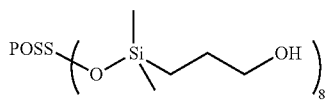

The above Chemical Formula 12 represents a form where 8 H atoms are substituted by —(CH$_2$)$_3$OH in Chemical Formula 11, wherein POSS is an abbreviation of polyhedral oligomeric silsesquioxane.

2) Synthesis of octakis(bromodimethylesterpropyldimethylsiloxy)-octasilsesquioxane: OBPS About 0.745 g of OHPS is put in a 100 ml round-bottomed flask and dissolved in about 15 ml of dichloromethane, and then cooled to about 0° C. using ice water. Then, about 1.14 ml of triethylamine is injected and sufficiently agitated. Subsequently, about 1.014 ml of 2-bromoisobutyryl bromide is dripped therein. After the injection is completed, the reaction solution is agitated at room temperature for about 12 hours. The product is dissolved in about 100 ml of dichloromethane, and then moved to a 500 ml separatory funnel and extracted twice with about 100 ml of distilled water to remove salts produced as a by-product. Water is removed from the dichloromethane layer using MgSO$_4$, and then a solid phase is filtered and the solvent is removed with a rotary evaporator. The obtained, material is purified by column chromatography (mobile phase EA:Hexane=1:3 (volume ratio)) to obtain a final product of about 1.06 g of OBPS (see the following Chemical Formula 13).

[Chemical Formula 13]

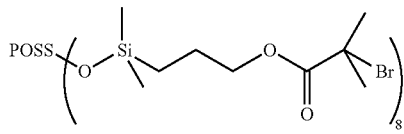

In the above Chemical Formula 13, POSS is the same as defined in Chemical Formula 12.

Synthesis of Star (PMMA-r-PPEGMA) Series Using OBPS

Example 1

SPM15

Star (PPEGMA-r-PMMA) series (referred to as "SPM#", wherein # denotes a relative mole ratio of PEGMA in PEGMA and PMMA) are synthesized by atom transfer radical polymerization, using OBPS as an 8-arm initiator. The reaction is progressed using anisole as a solvent.

Figure 3:
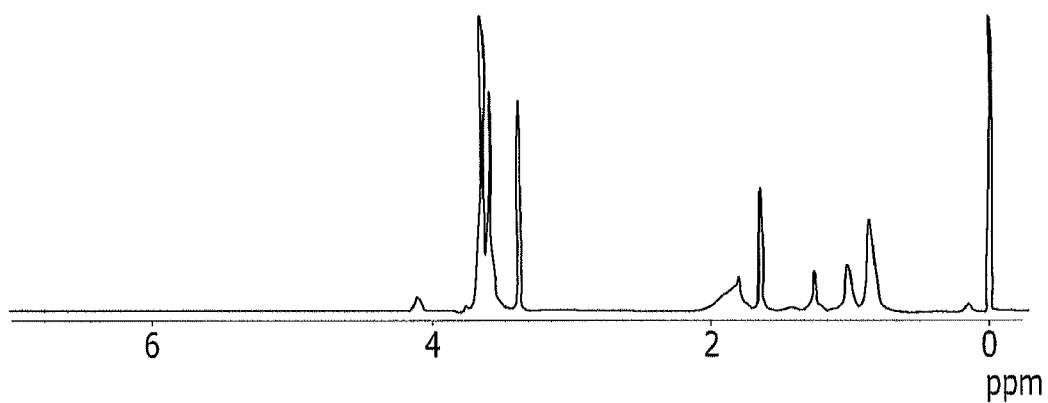
FIG. 3 is a hydrogen nuclear magnetic resonance spectrum of the compound synthesized in Example 1.

First, about 0.076 g of OBPS, about 2.38 g of polyethylene glycol monomethylethermethacrylate ($M_n$-475, PEGMA), about 2.28 g of methylmethacrylate (MMA), and about 14.2 ml of anisole are put in a 100 ml Schlenk flask, and agitated. Oxygen is removed from the reaction solution by conducting a freeze-pump-thaw (FPT) process three times. Then, about 16.6 mg of Cu(I)Br is added under nitrogen injection, and an FPH process is conducted again twice. The reaction flask is located in an oil bath of about 65° C., and about 24.0 µl of N,N,N',N',N"-pentamethyldiethylenetriamine (PMDETA) is injected to initiate a reaction. After agitating for about 12 hours, the product is dissolved in about 50 ml of dichloromethane, and passed twice through a column filled with aluminum oxide to remove the catalyst. The obtained solution is precipitated in about 400 ml of hexane three times to obtain SPM15 (see the following Chemical Formula 14). The SPM15 is dissolved in $CDCl_3$ to obtain the $^1$H-NMR spectrum, and the result is shown in FIG. 3. The weight average molecular weight of the obtained SPM15 is confirmed as about 28,200.

[Chemical Formula 14]

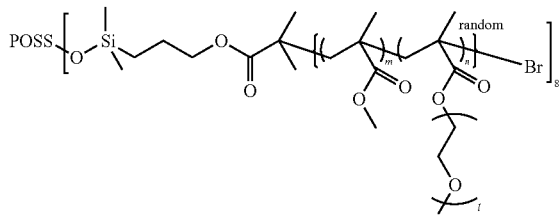

In the above Chemical Formula 14, POSS is the same as defined in Chemical Formula 12, and l denotes a polymerization degree.

Example 2

SPM 23

Figure 5:
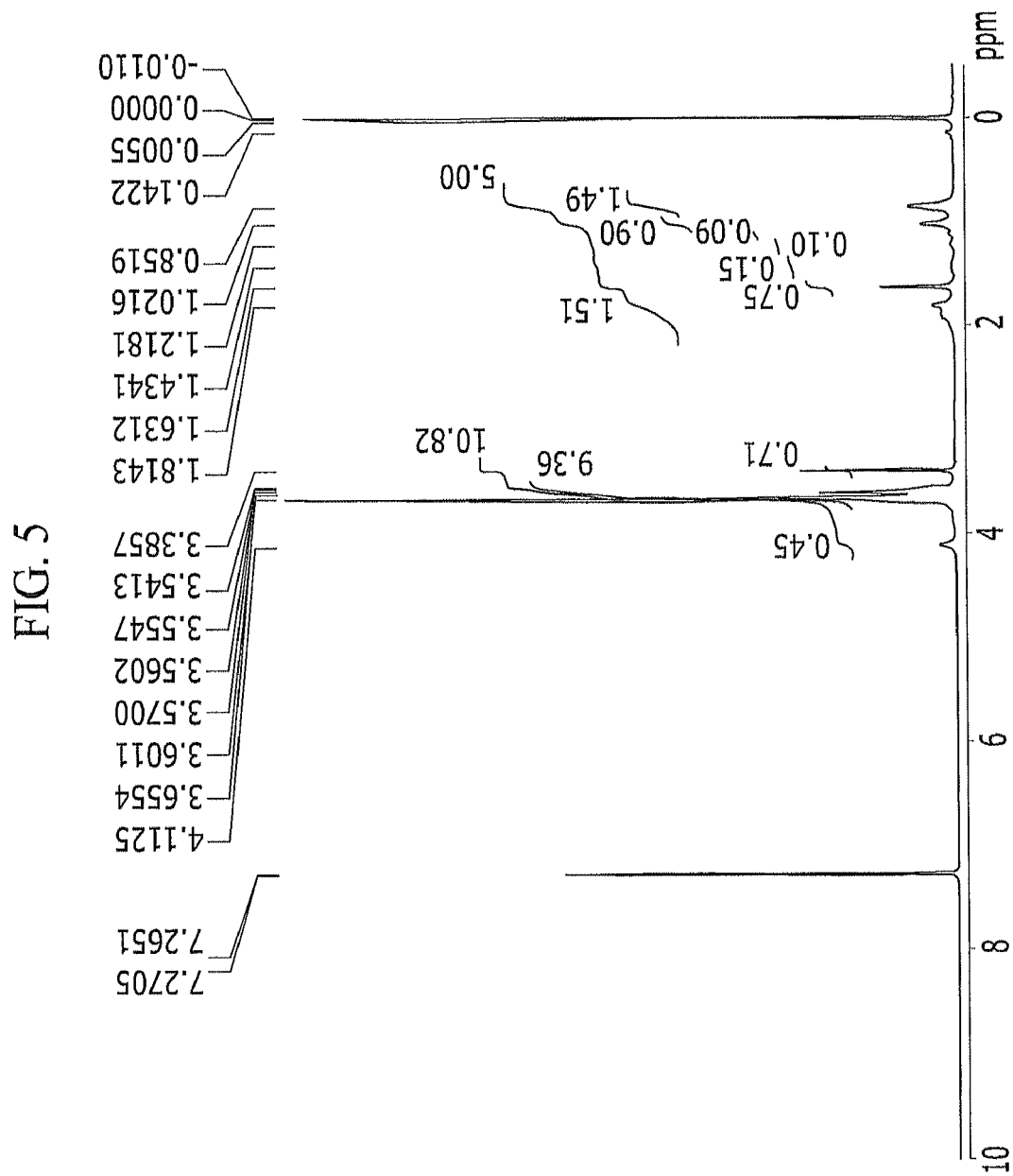
FIG. 5 is a hydrogen nuclear magnetic resonance spectrum of the compound synthesized in Example 2.

SPM23 is synthesized by a substantially equivalent method as in Example 1, except for using about 2 g of PEGMA, about 1.14 g of MMA, about 8.53 ml of anisole, about 0.042 g of OBPS, about 9.1 mg of CuBr, and about 13.20 µl of PMDETA. The SPM23 is dissolved in $CDCl_3$ to obtain the $^1$H-NMR spectrum, and the result is shown in FIG. 5. The weight average molecular weight of the obtained SPM23 is confirmed as about 24,700.

Example 3

SPM32

Figure 6:
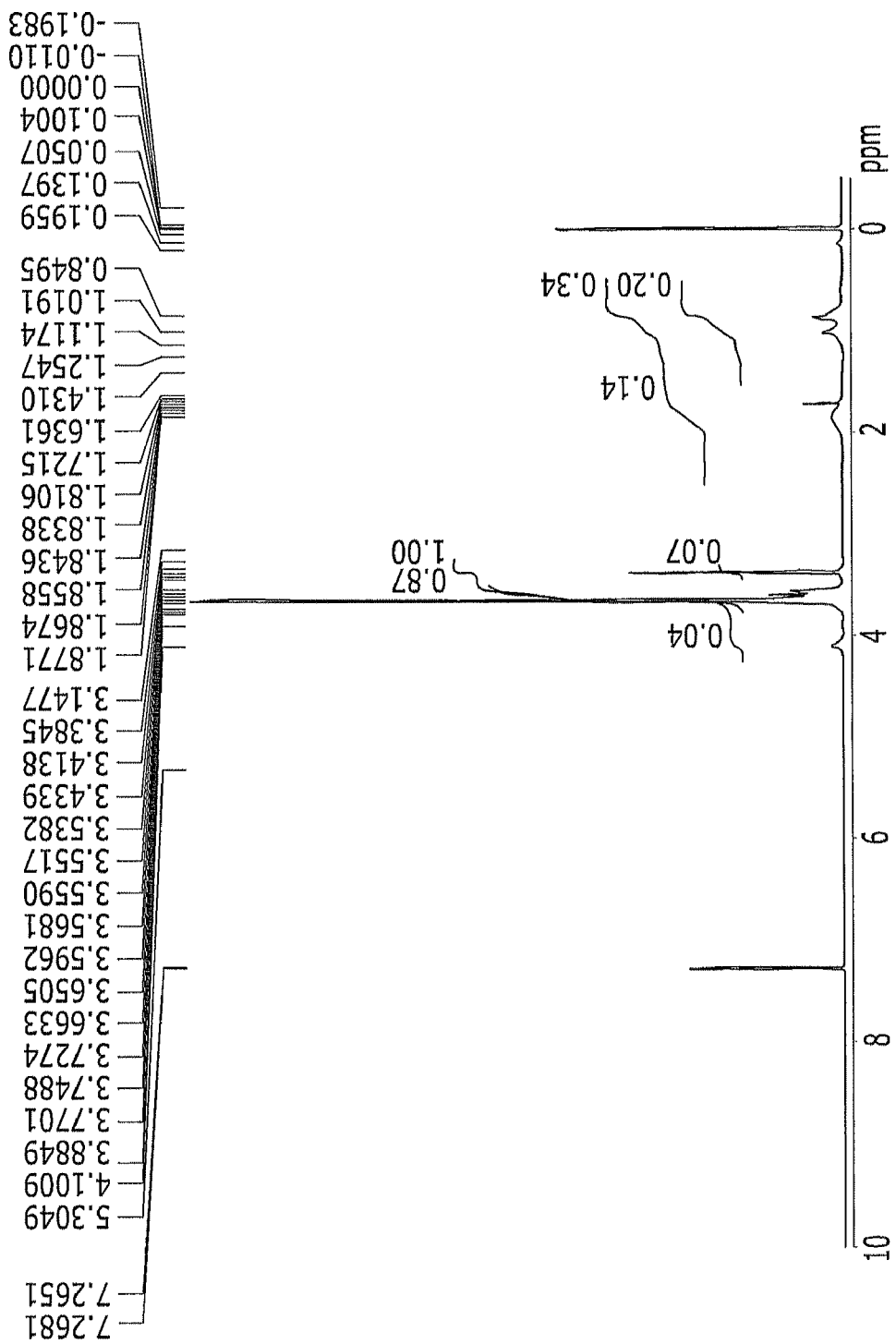
FIG. 6 is a hydrogen nuclear magnetic resonance spectrum of the compound synthesized in Example 3.

SPM32 is synthesized by a substantially equivalent method as in Example 1, except for using about 5.4 g of PEGMA, about 1.93 g of MMA, about 16.1 ml of anisole, about 0.086 g of OBPS, about 18.8 mg of CuBr, and about 27.1 µl of PMDETA. The SPM32 is dissolved in $CDCl_3$ to obtain the $^1$H-NMR spectrum, and the result is shown in FIG. 6. The weight average molecular weight of the obtained SPM32 is confirmed as about 29,200.

Example 4

SPM7

Figure 7:
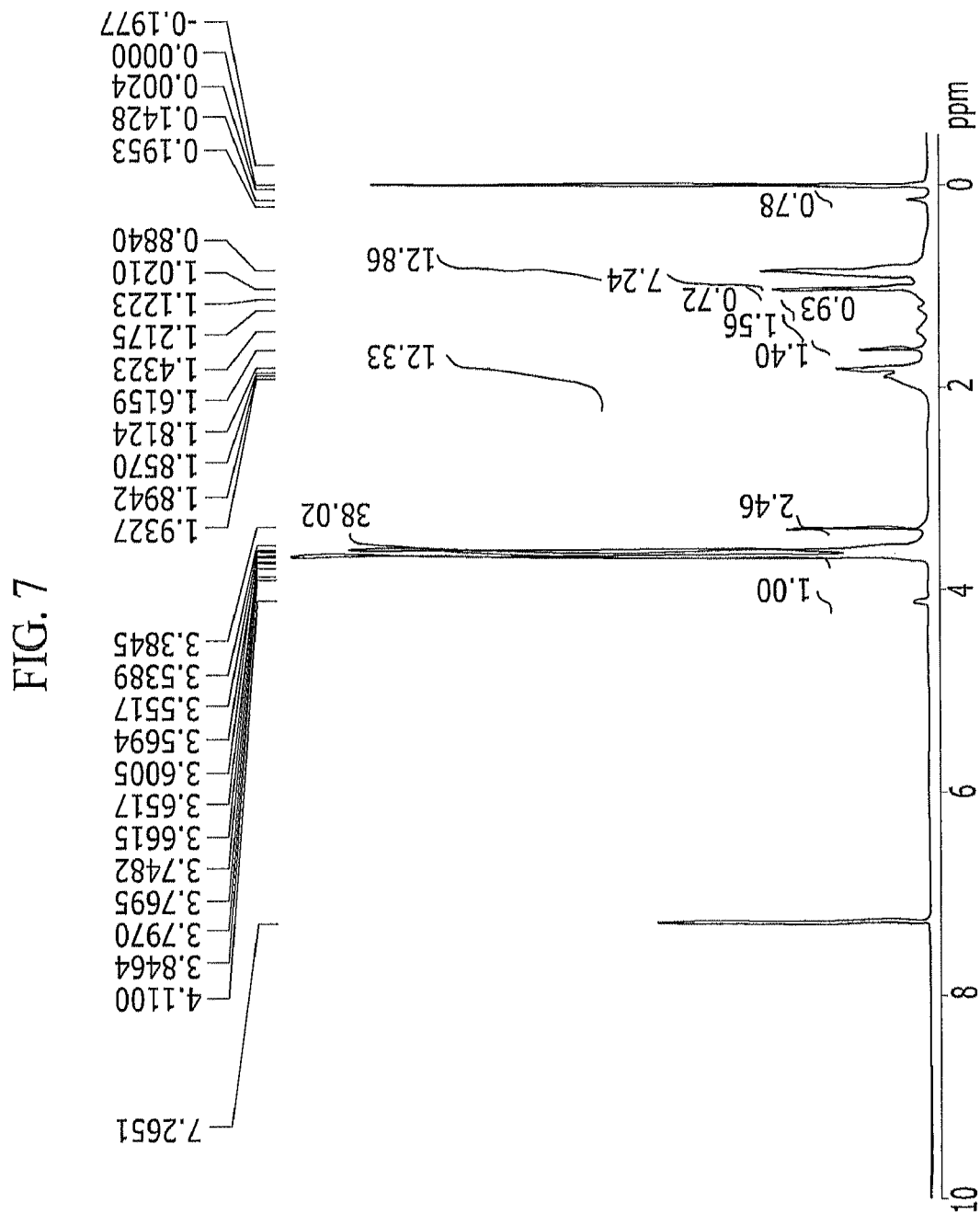
FIG. 7 is a hydrogen nuclear magnetic resonance spectrum of the compound synthesized in Example 4.

SMP7 is synthesized by a substantially equivalent method as in Example, except for using about 1.6 g of PEGMA, about 3.41 g of MMA, about 18.9 ml of anisole, about 0.101 g of OBPS, about 22.2 mg of CuBr, and about 32.0 µl of PMDETA. The SPM7 is dissolved in $CDCl_3$ to obtain the $^1$H-NMR spectrum, and the result is shown in FIG. 7. The weight average molecular weight of the obtained SPM7 is confirmed as about 28,200.

Comparative Example 1

SP

Figure 4:
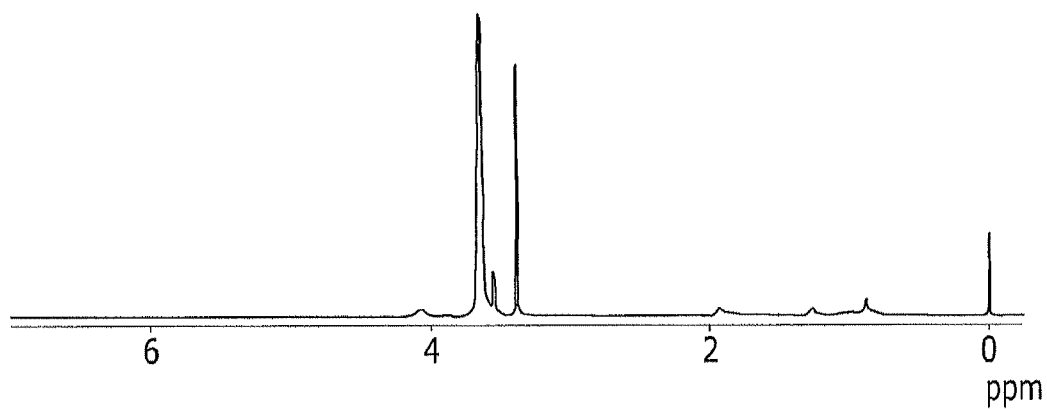
FIG. 4 is a hydrogen nuclear magnetic resonance spectrum of the compound synthesized in Comparative Example 1.

A material obtained by synthesizing by a substantially equivalent method as in Example 1, except for using about 7.2 g of PEGMA, about 0 g of MMA, about 8.53 ml of anisole, about 0.046 g of OBPS, about 10.0 mg of CuBr, and about 14.40 µl of PMDETA, is designated as SP. The SP is dissolved in $CDCl_3$ to obtain the $^1$H-NMR spectrum, and the result is shown in FIG. 4. The weight average molecular weight of the obtained SP is confirmed as about 53,500.

Comparative Example 2

LPM17

Figure 8:
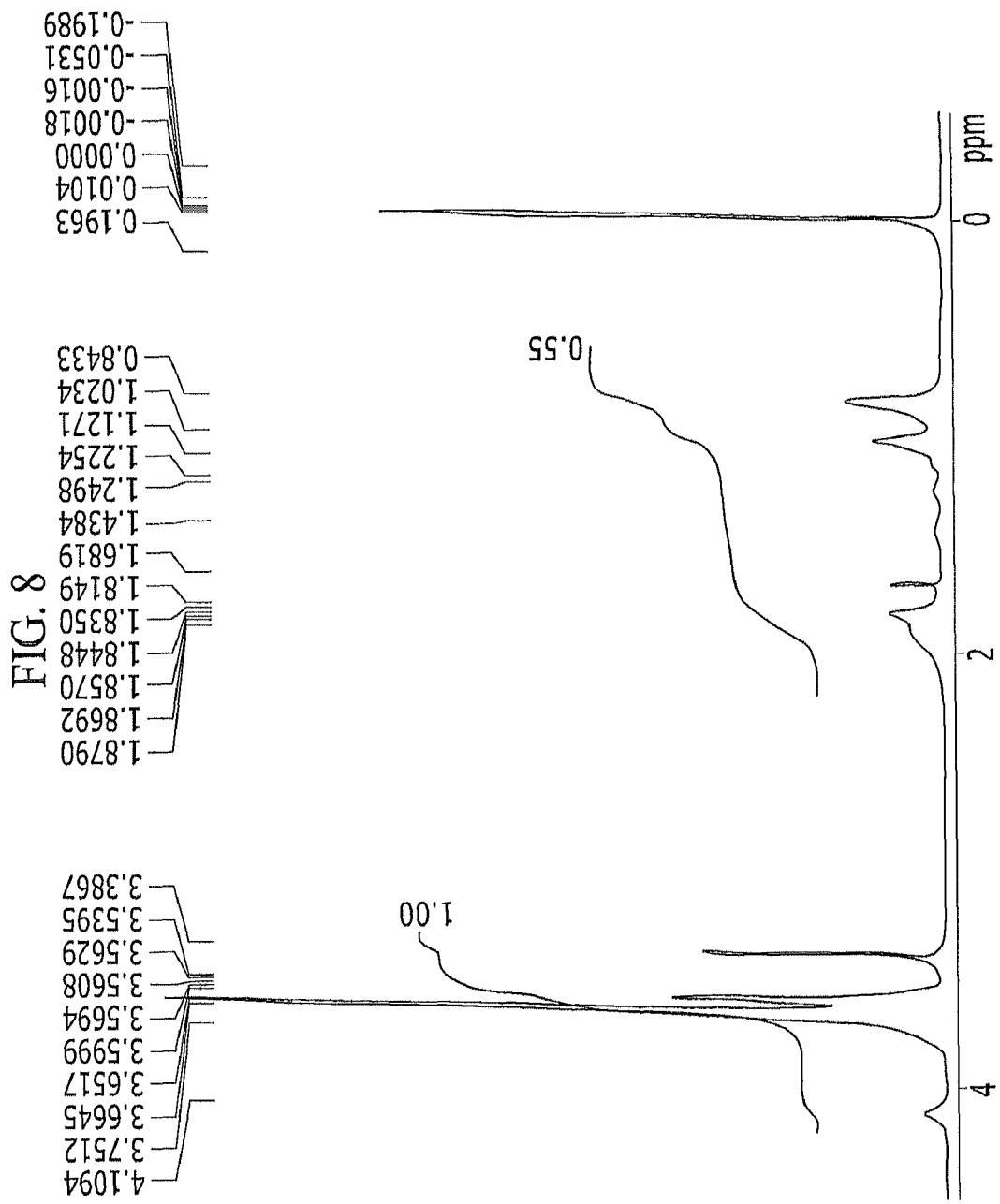
FIG. 8 is a hydrogen nuclear magnetic resonance spectrum of the compound synthesized in Comparative Example 2.

LPM17 is synthesized by atom transfer radical polymerization using ethyl 2-bromoisobutyrate (EBIB) as an initiator. The reaction is progressed with anisole as a solvent. First, about 48.2 µl of EBIB, about 3.61 ml of polyethylene glycol monomethylethermethacrylate (Mn: 475, PEGMA), about 3.5 ml of methylmethacrylate (MMA), and about 20.5 ml of anisole are put in a 100 ml Schlenk flask and agitated. Oxygen is removed from the reaction solution by conducting a FPT process three times. Subsequently, about 24.0 mg of Cu(I)Br is added under nitrogen injection, and then an FPT process is conducted again twice. The reaction flask is located in an oil bath of about 65° C., and about 34.60 µl of N,N,N',N',N"-pentamethyldiethylenetriamine (PMDETA) is injected to initiate a reaction. After agitating for about 12 hours, the product is dissolved in about 50 ml of dichloromethane, and passed twice through a column filled with aluminum oxide to remove the catalyst. A process of precipitating the obtained solution in about 400 ml hexane is repeated three times to obtain LPM17. The LPM17 is dissolved in $CDCl_3$ to obtain the $^1$H-NMR spectrum, and the result is shown in FIG. 8. The weight average molecular weight of the obtained LPM17 (see the following Chemical Formula 15) is confirmed as about 8900.

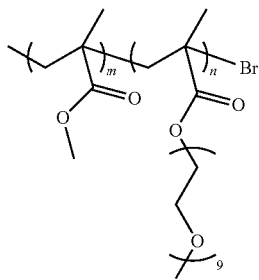

[Chemical Formula 15]

In the above Chemical Formula 15, m and n denote a polymerization degree.

<Evaluation of Solubility Characteristic>

Experimental Example 1

Solubility in water of each compound synthesized in Examples 1 to 4 and Comparative Examples 1 to 2 is evaluated, and the results are described in the following Table 1. To evaluate solubility, about 10 mg of each compound synthesized in Examples 1 to 4 and Comparative Examples 1 to 2 is impregnated with about 2 g of a solvent (water) at room temperature for about 24 hours, and allowed to stand. Then, as a result of visual inspection, if it is observed as a transparent liquid, it is judged to be soluble, and if precipitation is observed, it is judged to be insoluble.

Experimental Example 2

Solubility in methanol of each compound synthesized in Examples 1 to 4 and Comparative Examples 1 to 2 is evaluated by a substantially equivalent method as in Experimental Example 1, except for using methanol instead of water, and the results are described in the following Table 2.

TABLE 1

| | Mole ratio (PEGMA:MMA) | | |
| | Amount during synthesis (mol/mol) | Mole ratio of synthesized arm in polymer (mol/mol) | Shape |
|---|---|---|---|
| Example 1 (SPM15) | 18:82 | 15:85 | Star |
| Example 2 (SPM23) | 27:73 | 23:77 | Star |
| Example 3 (SPM32) | 37:63 | 32:68 | Star |
| Example 4 (SPM7) | 9:91 | 7:93 | Star |
| Comparative Example 1(SP) | 100:0 | 100:0 | Star |
| Comparative Example 2 (LPM17) | 20:80 | 17:83 | Linear |

TABLE 2

| | Solubility in water | Solubility in methanol |
|---|---|---|
| Example 1 (SPM15) | insoluble | soluble |
| Example 2 (SPM23) | soluble | soluble |
| Example 3 (SPM32) | soluble | soluble |
| Example 4 (SPM7) | insoluble | insoluble |
| Comparative Example 1 (SP) | soluble | soluble |
| Comparative Example 2 (LPM17) | insoluble | soluble |

Preparation of Membrane for Fouling Resistance

SPM 15 prepared in Example 1 and LPM17 prepared in Comparative Example 2 are respectively dissolved in methanol to prepare a solution, which is then coated on the surface of a commercially available polysulfone membrane by spin coating. The spin coating condition includes about a 1 wt % sample concentration, about 1000 rpm, and about 60 seconds. The result of Examples 1 to 4 in Table 2 shows that solubility in water and solubility in methanol can be controlled by the structure of the arms where the amounts of polyethylene glycol monomethacrylate(PEGMA) and methylmethacrylate (MMA) are varied. Examples 1 is appropriate to prepare a membrane for water treatment using methanol as a solvent for an organic/inorganic composite compound. The solubility results show that an appropriate ratio of PEGMA and MMA may exist so as to be applied for a fouling resistance material.

Analysis of Surface Shape of Membrane for Fouling Resistance

Figure 9:
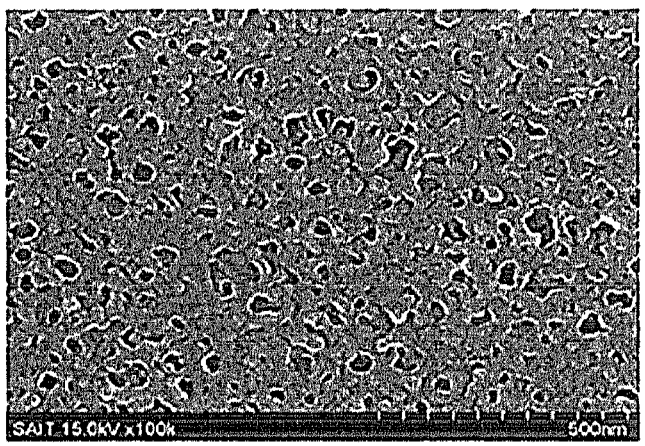
FIG. 9 shows scanning electron microscope photographs of separation membranes for water treatment manufactured so as to form a surface layer including the compounds synthesized in Example 1 and Comparative Example 2.
Figure 9:
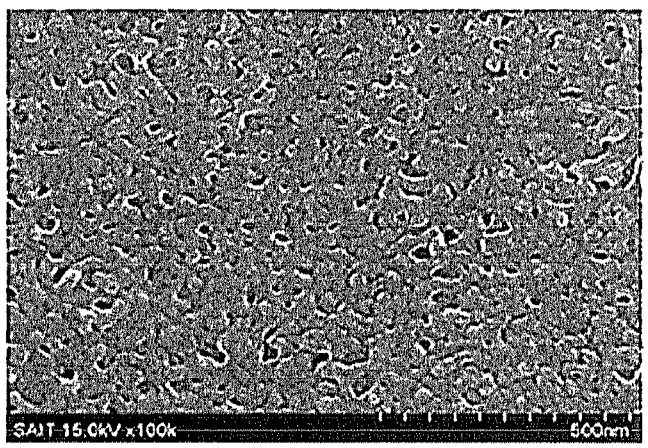
Figure 9:
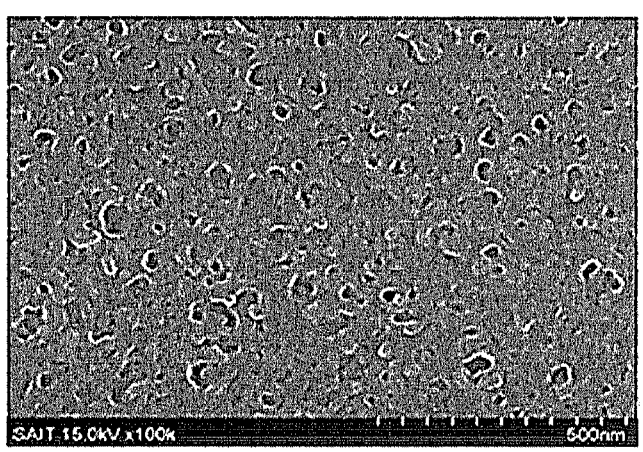

To confirm the surface shape change of the flat separation membrane, SPM15 of Example 1 and LPM17 of Comparative Example 2 are respectively coated on the surface of a polysulfone membrane as explained above to manufacture a fouling resistant separation membrane, of which surface is observed by a scanning electron microscope (SEM), and the results are shown in FIG. 9. FIG. 9 (a) is a scanning electron microscope photograph showing the shape of a commercially available ultrafiltration polysulfone membrane with a magnification of about 100,000 times, and FIGS. 9 (b) and (c) are scanning electron microscope photographs showing the cross-section structures of the fouling resistant separation membranes respectively manufactured by coating SPM 15 of Example 1 and LPM17 of Comparative Example 2 on the commercially available ultrafiltration polysulfone membrane of FIG. 9 (a), with a magnification of about 100,000 times. As shown in the drawings, it is confirmed that the pore size of the ultrafiltration membrane is maintained, and there is no significant difference between the shapes of separation membranes.

Measurement of Pure Water Permeation Rate

To determine performance of the ultrafiltration membranes prepared above, the pure water permeation rate is measured and the results are described in the following Table 3. First, each separation membrane is located on a cell having an effective area of about 41.8 cm$^2$ for measurement and then compacted under pressure of about 2 Kg/cm$^2$ for about 2 hours, and is measured under pressure of about 1 Kg/cm$^2$. The permeation rate is calculated by the following equation:

$$F = V/(A*t)$$

wherein V denotes the permeation rate, A denotes the area of the membrane, and t denotes the operation time.

TABLE 3

| | Coat conditions | Pure water permeation rate (LMH) |
|---|---|---|
| Ultrafiltration membrane (polysulfone) | — | 530 |
| Ultrafiltration membrane coated with SPM15 (Example 1) | 1 wt %, 1000 rpm, 60 s | 490 |
| Ultrafiltration membrane coated with SPM15 (Example 1) | 2 wt %, 1000 rpm, 60 s | 360 |
| Ultrafiltration membrane coated with LPM17 (Comparative Example 2) | 1 wt %, 1000 rpm, 60 s | 470 |

The LMH denotes the amount of passing water per unit hour, the L denotes the amount of water passing through the membrane (liter), the M denotes the area of the membrane (m²), and the H denotes passing time (hours). That is, it is an evaluation unit for how many liters of water pass through the membrane area of about 1 m² in about 1 hour. As shown in the Table 3, it is confirmed that when a methanol solution of about 1 wt % of SPM15 (Example 1), a methanol solution of about 2 wt % of SPM15 (Example 1), and a methanol solution of about 1 wt % of LPM17 (Comparative Example 2) are coated, the pure water permeation rate respectively decreases by about 8%, 30%, and 11% compared to the polysulfone ultrafiltration membrane before coating.

Measurement of Fouling Resistance

Figure 10:
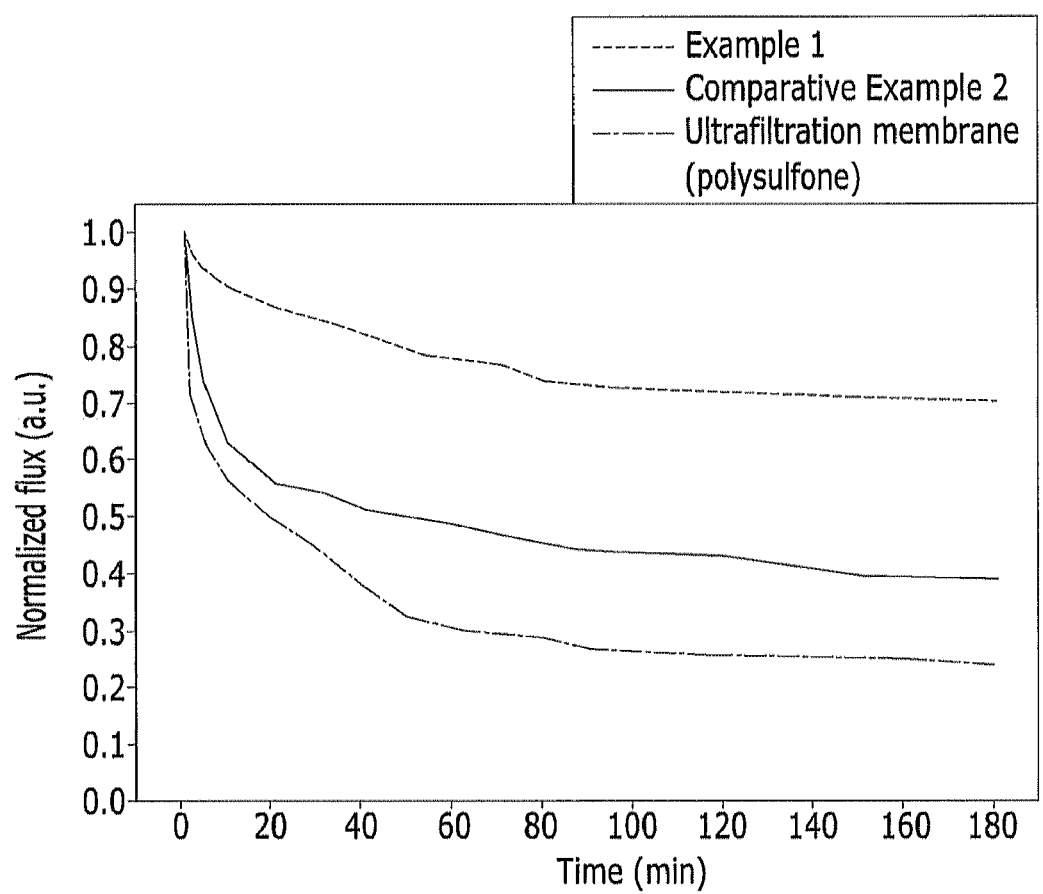
FIG. 10 is a graph showing the change in the amount of water permeation over time of the separation membranes manufactured so as to form a surface layer including the compounds synthesized in Example 1 and Comparative Example 2.

To determine fouling resistance performance of the coated ultrafiltration membrane, the permeation rate is measured. First, the separation membrane is located on a cell having an effective area of about 41.8 cm² for measurement, and is then measured under a pressure flow rate of about 1 Kg/cm² for about 3 hours. FIG. 10 is a graph showing the change of permeation rate over time, and the maintenance ratio of permeation rate after 3 hours is calculated and described in the following Table 4. As a fouling test material, a protein of bovine serum albumin (BSA) is used in a concentration of about 1.0 mg/mL in about 0.1M of a phosphate buffered saline (PBS) solution.

TABLE 4

| | Maintenance ratio of permeation rate after 3 hours (%) |
|---|---|
| Ultrafiltration membrane (polysulfone) | 24 |
| Ultrafiltration membrane coated with SPM15 (Example 1) | 69 |
| Ultrafiltration membrane coated with LPM17 (Comparative Example 2) | 39 |

As shown in Table 4, it is confirmed that the maintenance ratios of the permeation rate are respectively about 24%, about 69%, and about 39% for the ultrafiltration membrane before coating, the ultrafiltration membrane coated with about 1 wt % SPM15 (Example 1) solution, and the ultrafiltration membrane coated with about 1 wt % LPM17 (Comparative Example 2) solution. It can be seen that SPM15 (Example 1) has the best fouling resistance characteristic.

While various embodiments have been described herein, it should be understood that the disclosure is not limited to the disclosed example embodiments. On the contrary, the disclosure is intended to cover various modifications and equivalent arrangements included within the spirit and scope of the appended claims.

DESCRIPTION OF SYMBOLS

101: surface layer  102: inner layer

What is claimed is:

1. A membrane for fouling resistance comprising:
   a surface layer including an organic/inorganic composite compound for fouling resistance, the organic/inorganic composite compound including
   a core formed of a polyhedron of polyhedral oligomeric silsesquioxane; and
   at least one arm connected to an Si atom of the polyhedral oligomeric silsesquioxane, the at least one arm including a copolymerization product of a first structural unit and a second structural unit, wherein the first structural unit is represented by the following Chemical Formula 8:

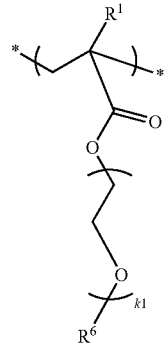

[Chemical Formula 8]

wherein, in Chemical Formula 8,
R⁵ and R⁶ are each independently hydrogen, a substituted or unsubstituted C1 to C30 alkyl group, a substituted or unsubstituted C5 to C30 aryl group, a substituted or unsubstituted C3-C30 cycloalkyl group, a substituted or unsubstituted C1-C30 heterocycloalkyl group, a substituted or unsubstituted C1-C30 heteroaryl group, a substituted or unsubstituted C2-C30 alkylaryl group, or a substituted or unsubstituted C2-C30 arylalkyl group,
* indicates a point of attachment with another atom or group, and
$k_1$ is an integer ranging from 1 to 500,
the second structural unit is represented by the following Chemical Formula 10:

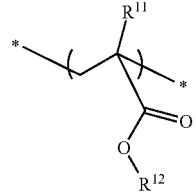

[Chemical Formula 10]

wherein, in Chemical Formula 10,
R¹¹ is hydrogen, a substituted or unsubstituted C1 to C30 alkyl group, a substituted or unsubstituted C5 to C30 aryl group, a substituted or unsubstituted C3-C30 cycloalkyl group, a substituted or unsubstituted C1-C30 heterocycloalkyl group, a substituted or unsubstituted C1-C30 heteroaryl group, a substituted or unsubstituted C2-C30 alkylaryl group, or a substituted or unsubstituted C2-C30 arylalkyl group,
R¹² is hydrogen, a halogen, a substituted or unsubstituted C1 to C30 alkyl group, a substituted or unsubstituted C5 to C30 aryl group, a substituted or unsubstituted C3-C30 cycloalkyl group, a substituted or unsubstituted C1-C30 heterocycloalkyl group, a substituted or unsubstituted C1-C30 heteroaryl group, a substituted or unsubstituted C2-C30 alkylaryl group, a substituted or unsubstituted C2-C30 arylalkyl group, or a substituted or unsubstituted C1 to C30 fluoroalkyl group, and
* indicates a point of attachment with another atom or group,
wherein the at least one arm includes the first structural unit and the second structural unit in a ratio of about 8 mol %:about 92 mol % to about 22 mol %:about 78 mol %.

2. The membrane for fouling resistance of claim 1, wherein an atomic ratio of Si to O in the polyhedron of the polyhedral oligomeric silsesquioxane is about 1:1 to 1:3/2.

3. The membrane for fouling resistance of claim 1, wherein the polyhedral oligomeric silsesquioxane is a pentahedron of the following Chemical Formula 1, a hexahedron of the following Chemical Formula 2, a heptahedron of the following Chemical Formula 3, an octahedron of the following Chemical Formula 4, an enneahedron of the following Chemical Formula 5, a decahedron of the following Chemical Formula 6, or an open polyhedron wherein O in at least one —Si—O—Si— bond of Chemical Formulas 1 to 6 is substituted with substituents:

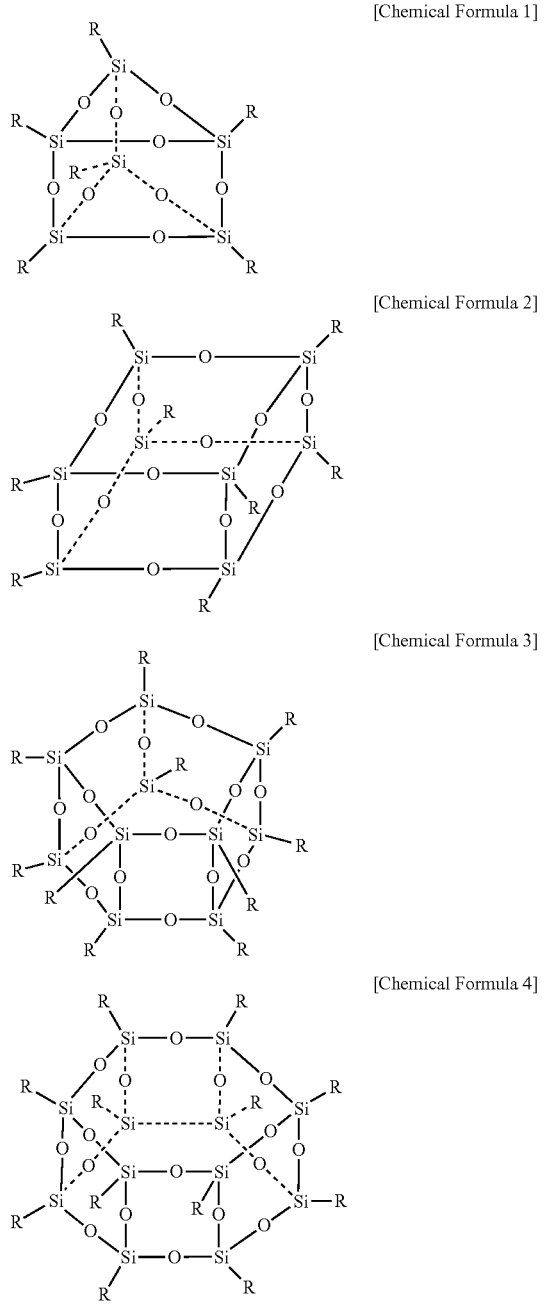

[Chemical Formula 1]

[Chemical Formula 2]

[Chemical Formula 3]

[Chemical Formula 4]

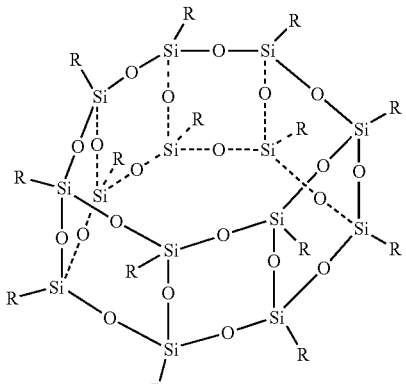

[Chemical Formula 5]

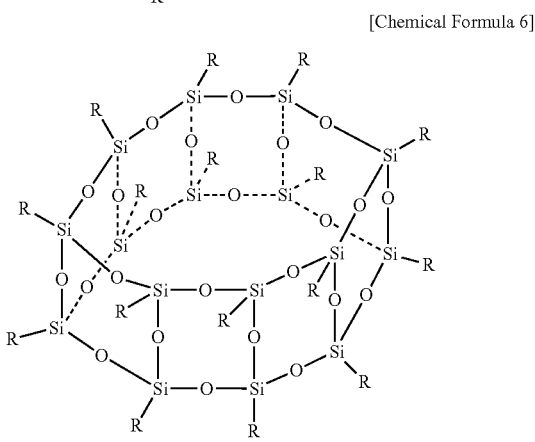

[Chemical Formula 6]

wherein, in Chemical Formulas 1 to 6,
groups represented by R are the same or different, and are each independently hydrogen, a hydroxy group, a nitro group, a cyano group, an imino group (=NH or =NR$^{101}$, wherein R$^{101}$ is a C1 to C10 alkyl group), an amino group (—NH$_2$, —NH(R$^{102}$), or —N(R$^{103}$)(R$^{104}$), wherein R$^{102}$ to R$^{104}$ are each independently a C1 to C10 alkyl group), an amidino group, a hydrazine group, a hydrazone group, a carboxyl group, a C1 to C30 alkyl group, a C1 to C30 alkylsilyl group, a C3 to C30 cycloalkyl group, a C2 to C30 heterocycloalkyl group, a C6 to C30 aryl group, a C2 to C30 heteroaryl group, a C1 to C30 alkoxy group, a C1 to C30 fluoroalkyl group, or an -L$^1$-A group (wherein L$^1$ is a linking group and A is the arm), provided that at least one group represented by R is an -L$^1$-A group.

4. The membrane for fouling resistance of claim 1, wherein the at least one arm includes 1 to 16 arms connected to the core.

5. The membrane for fouling resistance of claim 1, wherein the average k$_1$ value in Chemical Formula 8 in one arm ranges from about 5 to about 100.

6. The membrane for fouling resistance of claim 3, wherein L$^1$ is a single bond, —O—, —OOC—, —COO—, —OCOO—, —NW—(W is a hydrogen atom or a C1-C10 alkyl group), —CO—, —SO$_2$—, a substituted or unsubstituted C1-C30 alkylene group, a substituted or unsubstituted C5 to C30 arylene group, a substituted or unsubstituted C3-C30 cycloalkylene group, a substituted or unsubstituted C1-C30 heterocycloalkylene group, a substituted or unsubstituted C1-C30 heteroarylene group, a substituted or unsubstituted C2-C30 alkylarylene group, a substituted or unsubstituted C2-C30 arylalkylene group, a substituted or unsubstituted silylene group, a substituted or unsubstituted C2-C30 alkenyl group, a substituted or unsubstituted C2-C30 alkynyl group, or a group where at least one group of the foregoing groups is linked together.

7. The membrane for fouling resistance of claim 1, wherein the organic/inorganic composite compound is insoluble in water and soluble in at least one organic solvent selected from acetone, acids, alcohols, oxygen-containing cyclic compounds, heteroatom-containing aromatic compounds, halogen compounds, aprotic polar compounds, and acetates.

8. The membrane for fouling resistance of claim 1, wherein the surface layer has a thickness of about 0.01 to about 100 um.

9. The membrane for fouling resistance of claim 1, further comprising:
an inner layer including at least one compound selected from a polyacrylate-based compound, a polymethacrylate-based compound, a polystyrene-based compound, a polycarbonate-based compound, a polyethylene terephthalate-based compound, a polyimide-based compound, a polybenzimidazole-based compound, a polybenzthiazole-based compound, a polybenzoxazole-based compound, a polyepoxy resin compound, a polyolefin-based compound, a polyphenylene vinylene compound, a polyamide-based compound, a polyacrylonitrile-based compound, a polysulfone-based compound, a cellulose-based compound, polyvinylidene fluoride (PVDF), a polytetrafluoroethylene (PTFE), and a polyvinylchloride (PVC) compound.

10. The membrane for fouling resistance of claim 1, wherein the membrane for fouling resistance is a membrane for water treatment comprising an inner layer and the surface layer, the inner layer formed as a microfiltration membrane, an ultrafiltration membrane, a nanofiltration membrane, a reverse osmotic membrane, or a forward osmotic membrane.

11. The membrane for fouling resistance of claim 10, wherein the inner layer is a single membrane formed of a homogeneous material or a composite membrane comprising a plurality of layers formed of a heterogeneous material.

12. A method for manufacturing the membrane for fouling resistance of claim 1, comprising:
preparing a solution including the organic/inorganic composite compound for fouling resistance and a solvent, and
coating the solution on a surface of a membrane material requiring fouling resistance surface treatment so as to form a surface layer.

13. The method of claim 12, wherein the coating the solution includes solvent casting, spin casting, wet spinning, dry spinning, melt processing, or melt spinning.

14. The method of claim 12, wherein the preparing a solution includes adjusting a concentration of the solution to be about 0.1 to about 50 wt %.

* * * * *